June 5, 1934.  O. C. SPANENBERG  1,961,530
UNIVERSAL SEAT
Filed Aug. 11, 1931   2 Sheets-Sheet 1
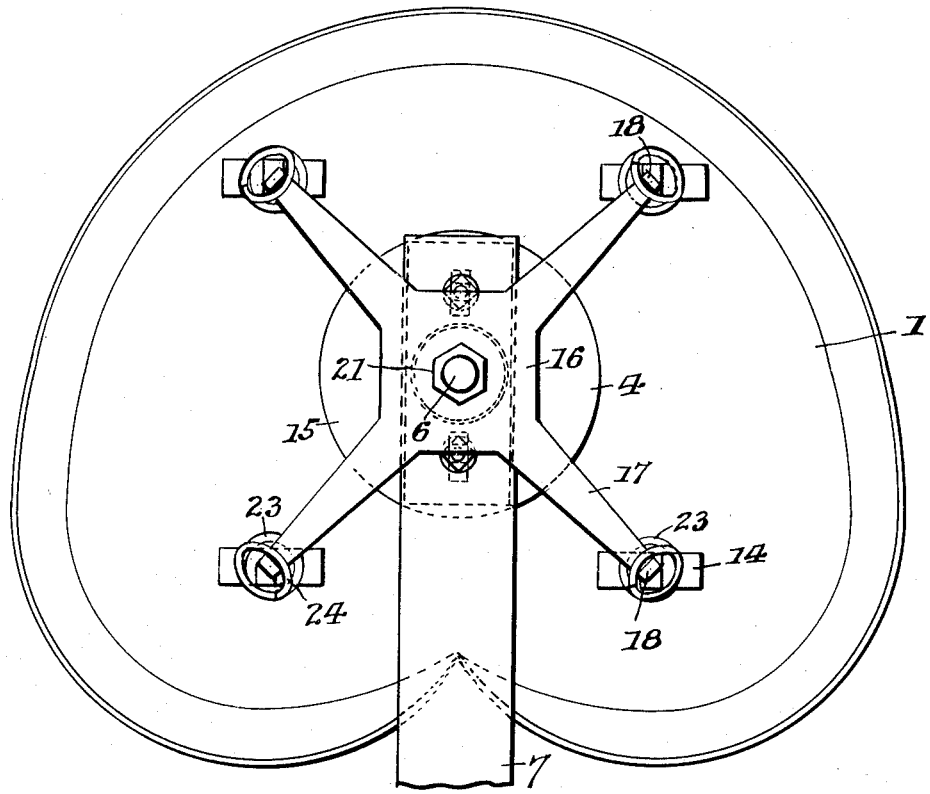
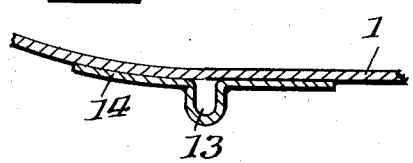
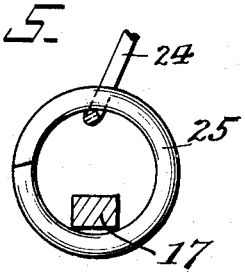
Inventor
O. C. Spanenberg
By Jacobi & Jacobi
Attorneys

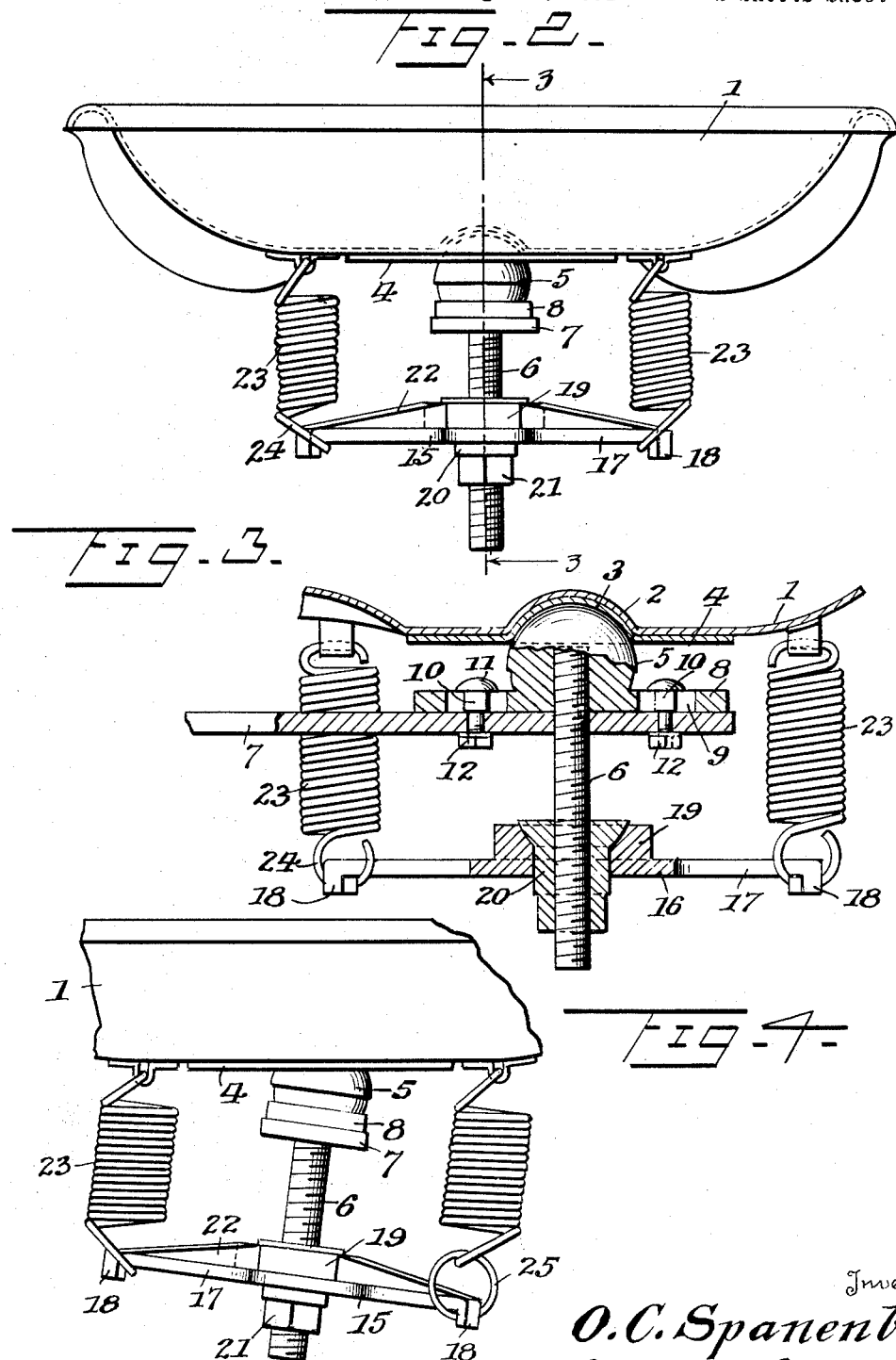

Patented June 5, 1934

1,961,530

UNITED STATES PATENT OFFICE 1,961,530

UNIVERSAL SEAT

Otto C. Spanenberg, Rockford, Mich.

Application August 11, 1931, Serial No. 556,433

5 Claims. (Cl. 155—54)

The present invention relates to improvements in seat structures for use more particularly upon farm implements, such as tractors, plows, harrows, wheel cultivators and the like.

More specifically, the present invention embodies certain improvements over my prior patent, Number 1,429,979, dated September 26, 1922.

One of the important objects of the present invention is to provide a seat that will at all times maintain a level or substantially horizontal position, regardless of the angle at which the farm implement with which the seat is associated, may be disposed.

Another object of the invention is to provide a universal seat that includes shock absorbers, thus assuring maximum comfort to the operator of the farm implement occupying the seat, means being provided for readily and easily adjusting the tension of the shock absorbing springs to suit the weight of the user and the degree of roughness of the land surface.

A still further object is to provide a universal seat of the above mentioned character which is simple in construction, inexpensive to manufacture, strong and durable, and further well adapted to the purposes for which it is designed.

Other objects and advantages of the invention will become apparent from the following description.

In the accompanying drawings, forming a part of this specification, and wherein like reference characters indicate corresponding parts throughout the several views:

Figure 1 is a bottom plan view of the universal seat embodying my invention;

Figure 2 is a rear side elevation;

Figure 3 is a vertical sectional view taken approximately on the line 3—3 of Figure 2;

Figure 4 is a fragmentary rear elevation embodying a modification, and showing the position of the seat when it is disposed at an angle;

Figure 5 is a detail of the ring that is employed in connection with the modification shown in Figure 4; and Figure 6 is a sectional view through one of the clips that is attached to the under side of the seat.

In the drawings, wherein for the purpose of illustration is shown the preferred embodiment of my invention, the numeral 1 designates a seat made of pressed steel and the bottom of the seat is formed at its central portion with the upwardly pressed portion 2 within which depression is arranged a pressed cup portion 3 of a plate 4 that is secured to the under side of the bottom of the seat 1 by any appropriate fastening means. The upwardly pressed cup portion 3 provides a socket for receiving the ball shaped head 5 that constitutes the upper part of a casting wherein the lower part of the casting comprises a plate 8.

The ball and socket arrangement shown and described above provides the means for universally mounting the seat 1. For the purpose of attaching the seat on a farm implement or the like, the upper end portion of the usual spring arm 7 that supports the seat is formed with an opening to accommodate the threaded shaft 6 and additional openings are arranged on opposite sides of the aforementioned opening.

A plate 8 is cast integrally with the flat bottom face of the head 5 and the central portion of this casting is formed with a threaded opening in its bottom to accommodate the upper end of the shaft 6, while on each side of this central threaded opening, there is formed in the plate 8 slots 9 within which is disposed the square shaped shoulder 10 formed on each of the headed bolts 11, the threaded shanks of the bolts extending through the respective openings formed in the upper end portion of the spring arm 7. The heads of the bolts engage with the upper face of the plate 8, while swivel nuts 12 are threaded on the lower ends of the bolts for engagement with the bottom face of the spring arm 7, as more clearly disclosed in Figure 3.

Welded to the bottom of the seat 1 at predetermined spaced points are the substantially U-shaped clips 13, the free ends of the arms thereof being disposed laterally as at 14 for connection with the under side of the seat, and this detail is clearly shown in Figure 6.

The present invention further comprehends the provision of a spider unit denoted generally by the numeral 15, and the same includes a plate-like body 16 of substantially rectangular configuration and extending radially from the respective corners thereof are the horizontally disposed arms 17. Each of these arms tapers gradually towards its outer end and terminates at its outer end in a depending finger 18 for a purpose to be presently described.

The central portion of the plate-like body 16 is formed with an enlargement 19 and aligned openings are formed in the plate-like body 16 and the enlargement 19 for accommodating the internally threaded sleeve 20 that has threaded engagement with the shaft 6. The lower end portion of the sleeve 20 is constructed with the tool engaging faces 21 whereby a wrench or the like may be applied thereto for facilitating rotation of the sleeve whereby to manually adjust the spider unit 15 along the shaft 6. Re-enforcing ribs 22 are formed on the upper face of the radially disposed arms 17 as clearly shown in Figure 2.

By referring to Figure 3 of the drawings, it will be observed that the upper end portion of the sleeve 20 is enlarged and manifestly the upper portion of the opening formed in the enlargement 19 is enlarged to co-operate with the enlarged upper end portion of the sleeve 20.

Contractile shock absorbing coil springs 23 are connected at their upper ends to the respective U-shaped clips 13 while the lowermost convolution 24 of each coil spring is disposed at an angle for arrangement over the outer end portion of the respective arm 17 and against the inner face of the depending finger 18. It is also to be understood that the uppermost convolution of each coil spring is disposed at an angle in order to permit said coil springs to assume a vertical position. These coil springs provide a means for normally maintaining the seat 1 in a horizontal position and the tension of the coil spring is regulated by adjusting the spider unit 15 on the threaded shaft 6, all of the coil springs being adjusted simultaneously.

With reference now more particularly to Figures 4 and 5 of the drawings, wherein there is shown a modification, it will be observed that a ring 25 provides a means for connecting the lower end of the outermost pair of coil springs to the adjacent radially disposed arms 17. Rings are to be used where the seat structure is associated with a tractor pulling a plow. For successfully guiding the plow the wheels of the tractor on the furrow side must run in the furrow and thus cause the tractor to run uneven. Rings in above mentioned springs provide that said seat will be maintained in a horizontal position.

A universal seat of the above mentioned character will at all times be positive and efficient in carrying out the purposes for which it is designed and furthermore, due to its simplicity, the tension of the shock absorbing springs can be readily and easily adjusted so as to assure maximum comfort to the operator of the farm implement occupying the seat. Furthermore, a seat of this character will be strong and durable.

While I have shown the preferred embodiment of my invention, it is to be understood that various changes in the size, shape and arrangement of the parts may be resorted to without departing from the spirit of the invention or the scope of the appended claims.

Having thus described my invention, what I claim as new is:

1. In a seat structure of the class described, a vertically disposed shaft, a supporting arm through which said shaft extends, a ball shaped head on the upper end of the shaft, a seat, the bottom thereof being formed with a depression to receive the ball shaped head and provide a universal connection between the seat and the shaft, a spider unit including a plate-like body arranged for vertical movement on the lower end of the shaft, arms extending radially from the plate-like body, contractile coil springs connected at their upper ends to the under side of the seat and at their lower ends to the outer ends of the respective arms, and means for adjusting the spider unit on the lower end of the shaft to regulate the tension of said coil springs, said means including an internally threaded sleeve journalled for rotation within a central opening formed in the plate-like body, the lower end of the sleeve extending beyond the adjacent face of the plate-like body and formed with tool engaging faces, the lower portion of the shaft being threaded through the sleeve.

2. In a seat construction, a seat, a vertically disposed shaft, a supporting arm through which said shaft extends, a universal connection between the seat and upper end of said shaft, a spider adjustable vertically along said shaft below the supporting arm, contractile springs connected at their upper ends to said seat and at their lower ends to said spider, and a mounting for said spider threaded upon said shaft for vertical adjustment thereon and extending through the spider and engaging the same to shift the spider along the shaft and adjust tension of the springs.

3. In a seat structure, a vertically disposed shaft, a support through which said shaft extends, a seat connected with the upper end of said shaft for universal tilting movement, a spider having a body adjustable vertically along said shaft below the support, arms rigidly carried by said body and extending from the same, contractile springs connected at their upper ends to the seat and at their lower ends to the arms of the spider, and means threaded upon said shaft and loosely engaged through the body of the spider for adjusting the spider along the shaft and holding the spider in an adjusted position to regulate tension of said springs.

4. In a seat structure, a vertically disposed shaft, a seat connected with the upper end of said shaft for universal tilting movement, a spider, contractile springs connected at their upper ends to the seat and at their lower ends to the spider, and means for adjusting the spider along the shaft to regulate tension of the springs, said means consisting of an internally threaded sleeve journalled for rotation within an opening formed in the spider and having threaded engagement with said shaft, said sleeve having its lower portion projecting downwardly from the spider and adapted for engagement by a turning tool whereby the sleeve may be rotated and moved longitudinally upon the shaft.

5. In a seat structure, a vertically disposed shaft, a ball shaped head at the upper end of said shaft, a supporting arm secured to said head, a seat provided with a socket receiving said head and providing a universal connection between the head and seat, a spider including a body having an opening therein through which the shaft extends, an enlargement rising from said body about the opening, contractile springs connected at their upper ends to said seat and at their lower ends to the spider, and means for adjusting the spider along said shaft to regulate tension of the springs, said means consisting of a sleeve threaded upon said shaft and having its upper portion extending through the opening in the spider and provided with a head at its upper end rotatably engaged with the enlargement to limit upward movement of the spider upon the sleeve and cause the spider to be shifted downwardly when the sleeve is rotated in one direction.

OTTO C. SPANENBERG.